No Printed Specification Available.
1507X
J. Gregg,
Pug Mill.
Patented May 7, 1811.
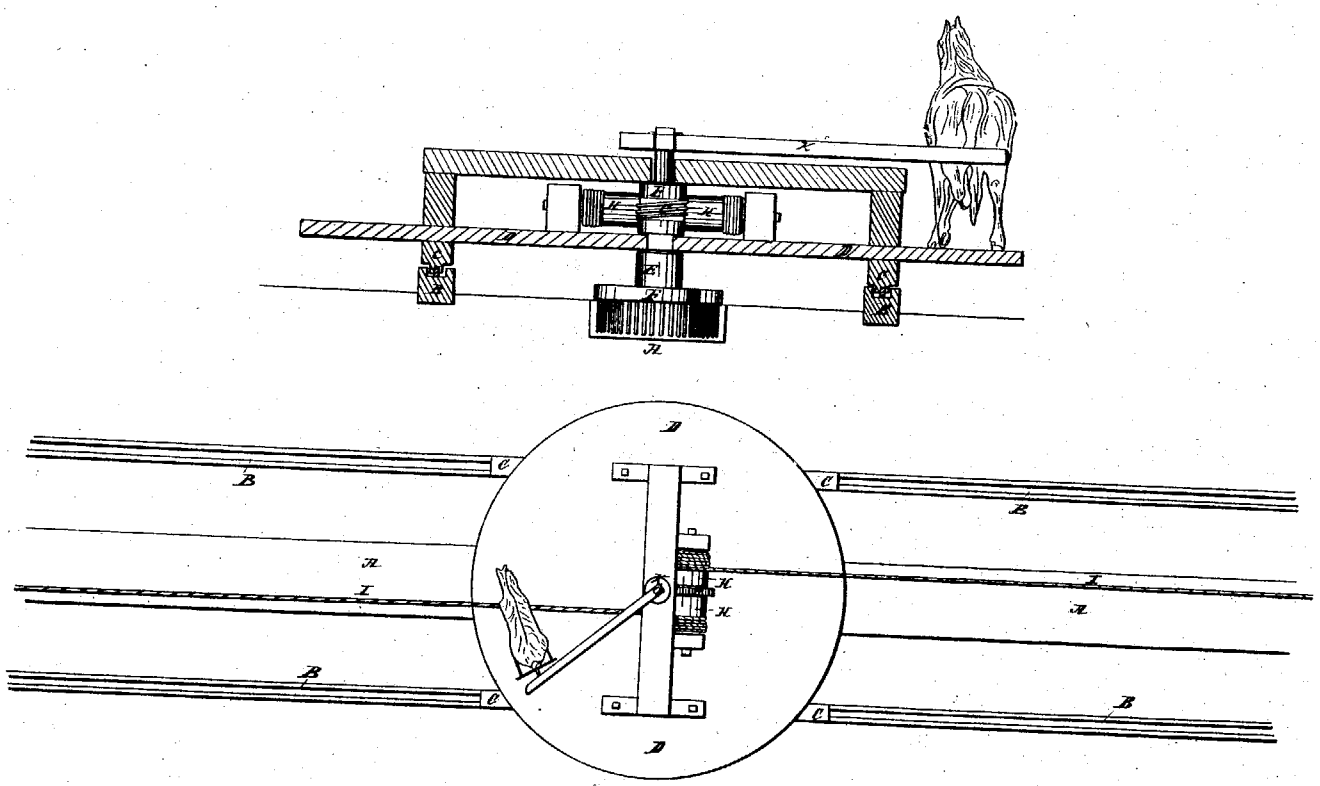

James [illegible]
[illegible] Patent

1507X

The schedule referred to in these Letters Patent and making part of the same, containing a description in the words of the said James Gregg him-self, of his mode of manufacturing clay for making bricks –

---

First – a bed is sunk in the ground one foot or more below the surface; it may be from twenty to two hundred feet in length, and four or more feet in width as occasion may require – The bottom and sides of the bed may be made of plank: but it will answer every purpose without the plank – about four feet from each side of the bed from one end to the other must be placed pieces of plank or timber a little sunk into the ground to make them secure and grooves made in them on which the machine is slowly and regularly to move – In the above mentioned grooves are fixed two pieces of timber twenty feet long, with three small wheels in the under side of each, on which a frame and plank floor twenty feet diameter is made. Two other pieces of timber, six feet long and eighteen inches deep are placed on the floor, running parallel with the two last mentioned pieces, to which they are secured by bolts and a beam on the top. Through this beam and the centre of the floor is fixed a perpendicular shaft four feet long and sixteen inches diameter. On the lower end of the shaft, under the floor is a horizontal wheel extending from one side of the bed to the other. In the under side, near the outer edge of this wheel is fixed a perpendicular row of knives or cutters one foot or more in length. For a wheel four and a half feet diameter twenty-four knives or cutters will be required – Two rows may be used as the wheel must work both ways both edges of the knives must be sharp. The outside of the knives are flat and the inside convex; on the shaft, about nine inches above the floor is a circular screw which is connected with the cogs of a windlass. A rope or chain is secured round each end of the windlass and extends to each end of the mortar bed, where it is fastened – a sweep being fixed on the upper end of the shaft a horse will move the machine and himself backward and forward from one end of the bed to the other, every time the

[illegible]

[illegible] one eighth of an inch [illegible]

and make perfect mortar for forty thousand of bricks —

Witnesses

Silas Whitney Jun:r

Sam:l Gregg —

James Gregg

[illegible] [5/10 [illegible]]

1507X